Figure 1:
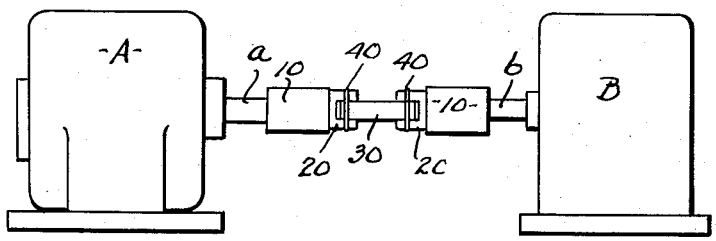

Oct. 6, 1953 N. A. CHRISTENSEN 2,654,234
COUPLING
Filed April 15, 1950

INVENTOR
NIELS A. CHRISTENSEN
BY Bates, Teare & McDean
Attorneys

Patented Oct. 6, 1953

2,654,234

UNITED STATES PATENT OFFICE 2,654,234

COUPLING

Niels A. Christensen, South Euclid, Ohio

Application April 15, 1950, Serial No. 156,216

3 Claims. (Cl. 64—6)

This invention relates to a coupling adapted to connect two rotatable members as, for instance, a driving motor and a suitable machine driven thereby. The object of the invention is to provide such coupling in an extremely simple form, which may be readily mounted on shafts of the driving and driven member without displacing such members. Another object is to provide such simple coupling in a form which will effectively connect the driving and driven shafts, even though the shafts may not be in alignment. The invention is illustrated in the drawings hereof and hereinafter more fully explained and its essential novel features are summarized in the claims.

Figure 2:
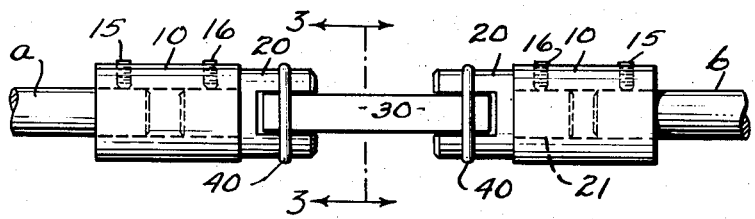
Figure 3:
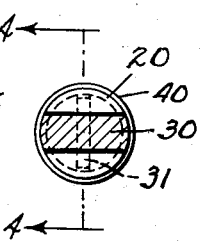
Figure 4:
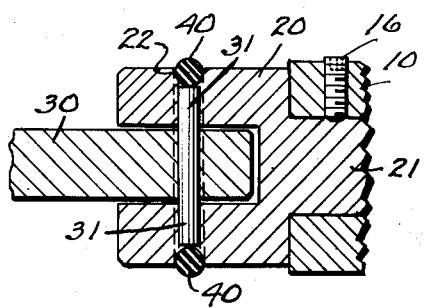
Figure 5:
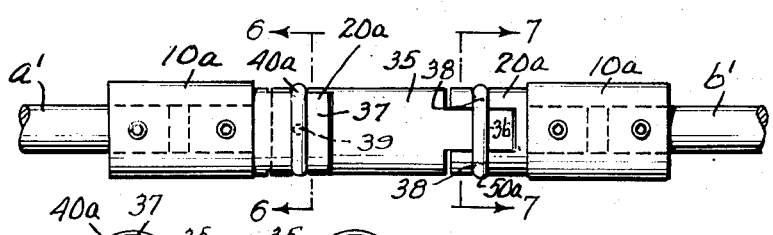
Figures 6, 7:
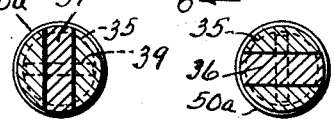

In the drawings, Fig. 1 is a side elevation of my coupling connecting a motor shaft with a shaft of a machine to be driven; Fig. 2 is an enlarged elevation of the coupling shown in Fig. 1; Fig. 3 is a cross section of the coupling in a plane indicated by the line 3—3 on Fig. 2; Fig. 4 is an enlarged detail through the coupling being a fragmentary longitudinal section; Fig. 5 is an elevation of a modified form of my coupling; Figs. 6 and 7 are transverse sections on the correspondingly numbered lines on Fig. 5.

In Fig. 1, A indicates any suitable driving member, as, for instance, a motor having a shaft $a$, and B indicates a driven member which, for instance, might be a pump having a driving shaft $b$. My coupling provides a pair of sleeves 10 adapted to be mounted on the projecting shafts $a$ and $b$; a pair of forked heads 20 mounted in the open ends of the sleeves, and a connecting member 30 extending into the forked members and connected thereto by pins 31.

The sleeves 10 are clamped on the respective shafts by suitable set screws 15 preferably of the Allen type. The forked heads 20 have reduced shanks 21 entering the sleeves 10 and clamped thereto by set screws 16, also preferably the Allen type.

The pins 31 which attach the connecting bar 30 to the two forked heads 20 are shorter than the diameter of the heads 20 and thus terminate at opposite ends a suitable distance within the outer periphery of the head. Each head has an annular groove 22 intersecting the end portions of the diametric opening occupied by the pin 31. In this annular groove I place an elastic toroidal ring 40 which embraces the head 20 and extends across the ends of the pin 31 and thus retains it in place, as illustrated particularly in Fig. 4.

In the embodiment of Figs. 1 to 4, I have shown the connecting member 30 as a flat bar and two pins 31 as being parallel to each other. Such construction is suitable where the driving and driven shafts $a$ and $b$ align with each other. However, to couple two members where the shafts do not strictly align, I prefer to place the two pins pivoting the connecting member to the forked heads at right angles to each other, thus giving the coupling the character of a universal joint.

The universal joint type of coupling is illustrated in Fig. 5, wherein the sleeves 10$a$ are shown as mounted, in the same manner as the sleeves 10, above described, on two shafts $a-1$ and $b-1$, and the two heads 20$a$ are mounted as before in the sleeves but have their forked openings at right angles to each other. In this case the connecting member is preferably of cylindrical formation, as shown, as 35 and has at one end a tongue 36 and at the other end a tongue 37 at right angles to the tongue 36. A pin (indicated by the dotted line 38) passes through the short dimension of the tongue 36 and a pin 39 passes through the short dimension of the tongue 37, these two pins being at right angles to each other. Each of the pins are held in place by an elastic toroidal ring 40$a$ of rubber-like material occupying a groove in the forked head as heretofore described.

By reason of the connecting pins 38 and 39 being at right angles to each other the shafts $a-1$ and $b-1$ need not strictly align but are effectively coupled by the universal joint which my coupling provides.

It will be seen that by rolling back the toroidal ring 40 or 40$a$ out of the annular groove in either of the forked heads the corresponding attaching pin becomes free and may be shoved out of the opening in the head. This separates the coupling and enables the sleeves to be mounted on the shafts to be coupled without changing the position of the machines having such shafts.

In either embodiment of my invention, shown in the drawing, each of the two sleeves preferably has its cylindrical bore extending throughout the sleeve, and the reduced shank has the same diameter as the shaft on which the sleeve is mounted. This simplifies the assemblage as the sleeve may be mounted at either end embracing the shank of the forked head. If the shafts to be coupled are of the same diameter, as is frequently the case, both sleeves may have their bores of the same diameter, enabling the entire coupling to be installed with either end toward the driving member and driven member respectively.

The toroidal rings provide simple and effective means for holding the pivot pins in place. Should there be an occasion to disconnect the coupling without changing position of the driving or driven member or their shafts, this is readily effected by removing one of the rings (simply rolling it back on the exterior and the forked head) and knocking out the exposed pin thus disconnecting the connecting member.

I claim:

1. In a coupling, the combination of a pair of forked heads facing each other and each provided with means for securing it to a shaft, a connecting member entering the forks in the two heads, pins mounted in said heads and loosely passing through the heads and the member, annular grooves in the exterior of the heads intersecting the openings occupied by the pins and toroidal endless rubber-like rings in said grooves, each ring being stretched in its respective groove and having an inner diameter when unstretched less than the inner diameter of the groove across the head to hold the pins in place.

2. A compound coupling comprising a pair of sleeves adapted to be mounted on the projecting ends of a pair of shafts, a pair of forked heads each having a shank entering the other end portion of said sleeves, means for securing the sleeves to the shaft and the head shanks in the sleeve, a bar entering the forks of the two heads, pins mounted in the heads and extending loosely across the bar and the heads, there being an annular groove about the periphery of each head intersecting the opening occupied by the corresponding pin, and an endless elastic toroidal ring in each groove, each ring being stretched in said groove and having an inner diameter when unstretched less than the inner diameter of the groove across the head to hold the pins in place.

3. A compound coupling comprising a pair of sleeves having a bore extending from end to end and adapted to be mounted on projecting ends of a pair of shafts to be coupled, a pair of forked heads having reduced shanks entering the other ends of the sleeve, a pair of radial set screws mounted in each sleeve and adapted to engage the shaft and the shank of the corresponding head respectively, a connecting bar extending from one head to the other and occupying the forked openings thereof, diametric pins carried by said heads and loosely passing through the bar and the corresponding heads, and annular grooves in each head intersecting the corresponding pin opening, each groove formed to provide an annular seat having a substantially semi-circular base, and an endless elastic toroidal ring of rubber-like material occupying the groove of each head and extending across the ends of the corresponding pin, each ring being substantially circular in cross section and being stretched in said groove, and having an inner ring diameter when unstretched less than the inner diameter of the groove across the head to hold the pins in place.

NIELS A. CHRISTENSEN

References Cited in the file of this patent

UNITED STATES PATENTS

| Number | Name | Date |
| --- | --- | --- |
| 88,902 | Pierce | Apr. 13, 1869 |
| 833,153 | Blakeslee | Oct. 16, 1906 |
| 1,247,642 | Clark et al. | Nov. 27, 1917 |
| 1,849,174 | Carter | Mar. 15, 1932 |
| 1,988,967 | Emrick | Jan. 22, 1935 |
| 2,144,269 | Peltz | Jan. 17, 1939 |